United States Patent [19]

Rhodes et al.

[11] 4,109,554

[45] Aug. 29, 1978

[54] FEED GUIDE ATTACHMENT FOR BAND SAW MACHINES

[76] Inventors: Arthur J. Rhodes, 2601 Benoch Ave., Louisville, Ky. 40216; William J. Rhodes, 3343 Campground Rd., Louisville, Ky. 40211

[21] Appl. No.: 759,260

[22] Filed: Jan. 14, 1977

[51] Int. Cl.² .............................................. B26D 1/54
[52] U.S. Cl. ...................................... 83/565; 83/413; 83/820
[58] Field of Search ................ 83/820, 413, 442, 565, 83/825, 747

[56] References Cited

U.S. PATENT DOCUMENTS

| 357,678 | 2/1887 | Maxwell | 83/413 |
| 3,473,580 | 10/1969 | Dunn et al. | 83/413 X |
| 4,014,235 | 3/1977 | Fukami | 83/413 X |

Primary Examiner—Willie G. Abercrombie

[57] ABSTRACT

A feed guide attachment for a band saw blade including a plurality of movable links with at least two rotatable guide rollers attached to at least one of the links engageable with a template wherein the remaining links are interconnected to move in relation to the movement of the link having the rotatable guide rollers thereon and in turn moving the band saw blade in conformance with the contour of the template.

9 Claims, 4 Drawing Figures

4,109,554

FEED GUIDE ATTACHMENT FOR BAND SAW MACHINES

BACKGROUND OF THE INVENTION

The invention relates to a work feed guide assembly for band saw machines and more particularly relates to a guiding attachment for band saw machines which may be mounted onto a band saw machine above a work table in a manner to readily engage with a workpiece and pattern therefor.

Band saw type cutting machines employ many applications in a pattern-control mechanism for successively feeding workpieces to a band saw machine whereby the workpieces are cut in conformity with the peripheral contour corresponding to that of the control pattern. However, many of these arrangements have required an elaborate system of guide rollers due to the heavy frictional drag of the workpiece and its superposed pattern member on the work table. Furthermore, in many of these devices difficulty in sawing profiles has been experienced wherein the contour of the control pattern includes a radius of short curvature.

SUMMARY OF THE INVENTION

In the present invention it is recognized that it is desirable to provide a work feed mechanism for band saw machines. Furthermore, it is recognized that it is desirable to provide a work guide mechanism for a band saw machine which may be mounted on the machine above the work table wherein the guide means is readily engageable with a work unit. Even further, it is recognized that it is desirable to provide a guide mechanism for a band saw machine capable of guiding workpieces along a template having curves of relatively short radius.

According to the present invention, a work guide assembly for a band saw machine is mounted onto the work table of a band saw machine and includes a plurality of movable links, at least two rotatable guide rollers cooperating with the links engageable with the outer periphery of a template wherein the links are interconnected to move in relation to the movement of the rotatable guide rollers and in turn cooperates to move a band saw blade in conformance with the contour of the template.

More particularly, the present invention provides a guide attachment for band saw machines comprising: a pair of parallel spaced lower support members secured to a head frame of a band saw machine, one of the lower support members extending along the front of the head frame, the other extending along the back, the lower support members being pivotally attached in substantially the center of the support member, the pivot points being in alignment with each other; a pair of parallel spaced lower side arm link members pivotally attached at opposed ends to the lower support members, the lower link members extending outwardly beyond the lower front support member, each lower link member having a guide roller attached at the outwardly extending portion for rotation about vertically extending parallel axes and engageable with a template; and, cooperating means for positioning a band saw blade in parallel alignment with the contour of the outer periphery of the template.

Figure 1:
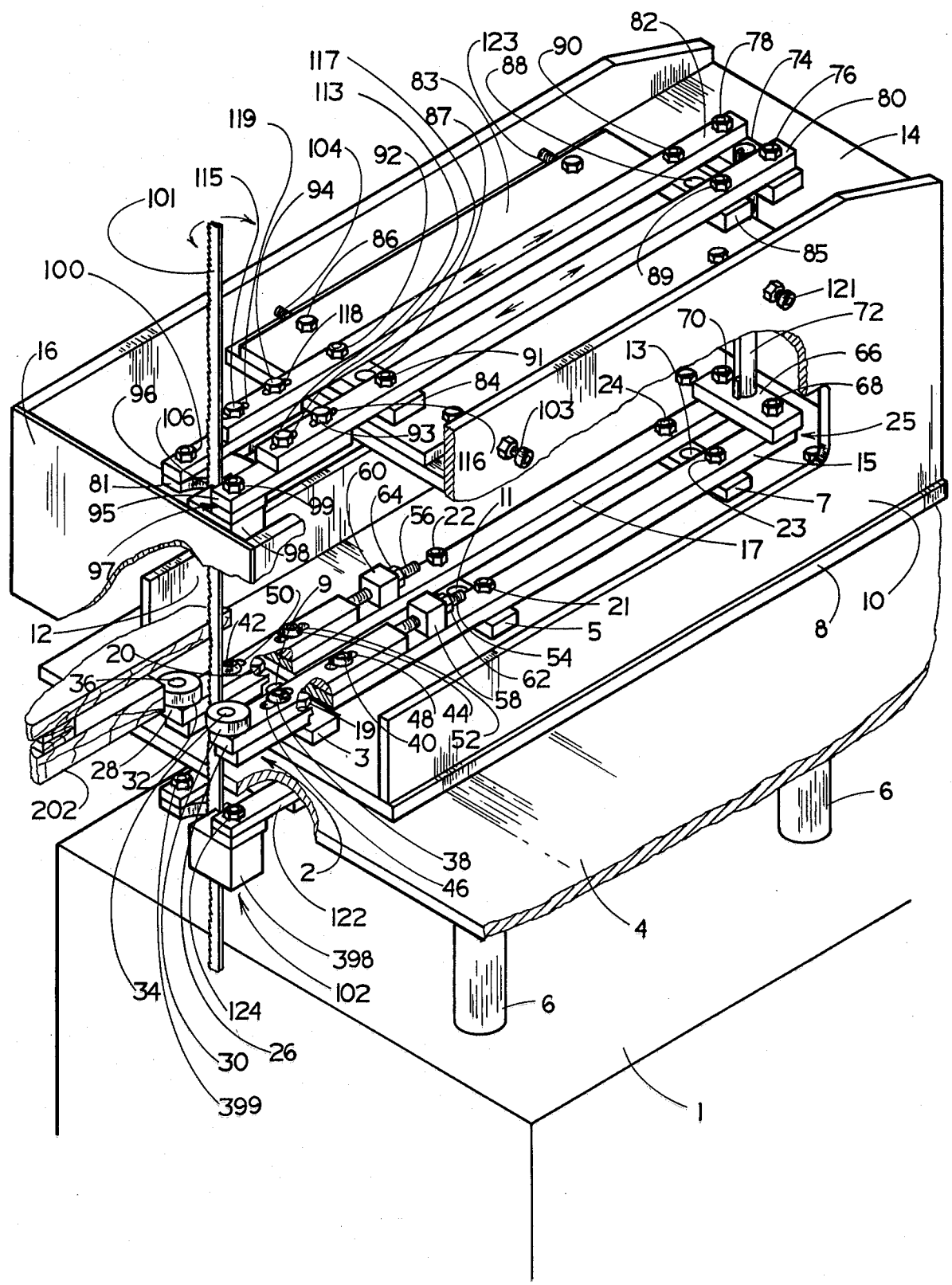
FIG. 1 is a perspective view, with selected portions cut-away, of a guide attachment for a band saw blade of the present invention.

In FIG. 1, a band saw work table 1 supports a work guide attachment or assembly 2 of the present invention. The guide attachment 2 is of generally C-shaped cross section and is attached to a horizontally extending flat plate member 4 which is mounted onto the work table 1 by a plurality of vertically extending support members 6. Attached to the flat plate member 4 is a second flat plate member 8 which is a base plate for the guide attachment 2. Extending upwardly from the sides of the base member 8 are two vertically extending side wall members 10 and 12 of C-shaped configuration, side wall members 10 and 12 extending along the sides of the guide attachment 2. A top wall member 14 is included and extends in a horizontal direction to support the upper portion of the guide attachment 2. A vertically extending front wall member 16 is also included to further define a housing for the guide attachment 2.

The guide attachment 2 is provided with a template follower assembly 25 which includes lower transversely extending flat bar support members 3, 5 and 7, respectively, which are movably attached to the support member 8 by pivot pins as noted by reference numerals 9, 11 and 13, respectively. Support members 3, 5 and 7 are in parallel with the pivot pins 9, 11 and 13 extending vertically through apertures (not shown) in the respective transversely extending support members 3, 5 and 7. Pivot pins 9, 11 and 13 are received within appropriate pivot pin receiving portions of the support 8, the pivot pins being substantially in the center of the support and in alignment with each other.

The lower support members 3, 5 and 7 are attached at each end to a longitudinally extending lower link member identifiable by numerals 15 and 17, the link members 15 and 17 being in parallel. Link members 15 and 17 are movably attached to the transversely extending front support member 3 by vertically extending pivoting bolt members 19 and 20; to the transversely extending middle bar support member 5 by pivoting bolt members 21 and 22; and, to the transversely extending rear bar support member 7 by pivoting bolt members 23 and 24.

Mounted onto the front end of each lower link 15 and 17 is an adjustable support bar, identifiable as guide roller adjusting bars 26 and 28. At the front end of each guide roller adjusting bar is a rotatably mounted guide roller, bar 26 having guide roller 30 attached thereto and bar 28 having guide roller 32 attached thereto. Guide rollers 30 and 32 are attached by vertically extending pivot pins 34 and 36, respectively, the guide rollers 30 and 32 extending outwardly beyond the outer end of the bars 26 and 28 for engaging with the peripheral contour of a template 202, to be discussed hereinafter.

The adjustably mounted guide bars 26 and 28 are attached to the link members 15 and 17 by a pair of adjusting bolts 38 and 40 on link member 15 and adjusting bolts 42 and 44 on link member 17. Each of the guide bars 26 and 28 include a pair of elongated openings therein to receive the bolts therethrough for longitudinal setting of the bars 26 and 28 in relation to the link members 15 and 17. Openings 46 and 48 are disposed to receive bolts 38 and 40 therein, respectively, and openings 50 and 52 are disposed to receive bolts 42 and 44 therein, respectively. The means for adjusting the bars are a pair of horizontally extending threaded bolt members 54 and 56 which are attached to the rear end of the bar members 26 and 28, respectively. Bolt members 54 and 56 are received by threaded receiving members 58 and 60, respectively, which are fixedly attached to the links 15 and 17, respectively. Lock nuts 62 and 64 are also provided for bolt members 54 and 56 to lock the guide rollers 30 and 32 in a preselected position.

At the rear end of the lower link members 15 and 17 is a transversely extending link member 66 which is attached by pivot pins 68 and 70 to the link members 15 and 17. Fixedly attached in the center of the transversely extending link member 66 and in alignment with the pivot pins 9, 11 and 13 is a vertically extending support rod 72. The vertically extending support rod 72 extends through an aligned aperture in the top wall 14 of the guide assembly housing and is fixedly attached at the top extremity to an upper transversely extending link member 74. Upper transversely extending link member 74 is pivotally attached by pivoting bolt members 76 and 78 to a pair of parallel upper longitudinally extending link members 80 and 82, respectively, which are movably attached to a top base member 83 which is fixedly attached to the top wall 14 through transversely extending movable bar support members 84 and 85. Base member 83 is attached to top wall 14 by bolts 86 and movable support members 84 and 85 are attached to the base member 83 by pivot bolt members 87 and 88, respectively. The transversely extending movable support members 84 and 85 support the upper movable link members 80 and 82 through pivot bolt members 89 and 90 at the rear support member 85 and, pivot bolt members 91 and 92 at the front support member 84.

Attached underneath the front end of the link members 80 and 82 is a pair of adjustably mounted support members 95 and 96 which support upper blade guide assembly 97 which is attached thereto. The support members 95 and 96 are attached to the link members 80 and 82 by a pair of adjusting bolts 93 and 113 on link member 80 and adjusting bolts 94 and 115 on link member 82. Each of the link members 80 and 82 are provided with a pair of elongated openings or slots therein to receive the bolts therethrough for longitudinal setting of the support members 95 and 96 in relation to the link members 80 and 82. Openings 116 and 117 are disposed to receive bolts 93 and 113 therein, respectively, and openings 118 and 119 are disposed to receive bolts 94 and 115 therein, respectively.

The upper blade guide assembly 97 includes a U-shaped bracket 81 with a vertically extending guide plate member 98 mounted onto one leg of the bracket 81. U-shaped bracket 81 is mounted underneath the support members 95 and 96 by pivot bolt members 99 and 100, respectively, and the vertically extending guide plate member 98 is provided with a vertically extending slot 106 therein to receive band saw blade 101 therethrough. However, only the back edge of the band saw blade 101 is received by the slot 106 so the saw blade 101 is rotatably moved in response to the cooperating movement of the link members 80 and 82.

Adjusting threaded members 103 and 104 at the front end and adjusting threaded members 121 and 123 at the rear end are provided for aligning the upper link members 80 and 82 in their appropriate alignment with lower link members 15 and 17.

Figure 4:
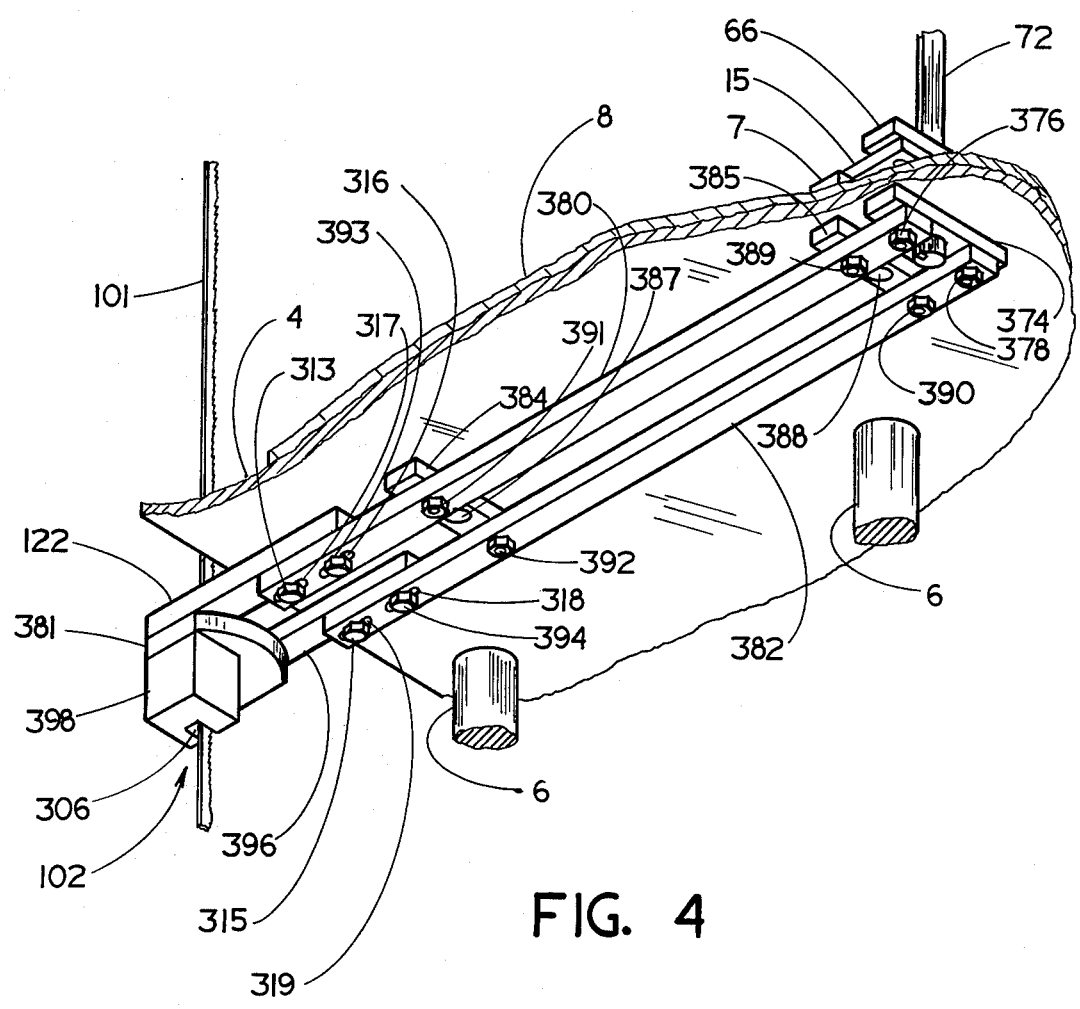

As shown in FIG. 4, the vertically extending support rod 72 also extends through an aligned aperture in the bottom support 8 and the flat plate member 4 of the guide assembly housing and is fixedly attached at the bottom extremity to a bottom rear transversely extending link member 374. Bottom transversely extending link member 374 is pivotally attached by pivoting bolt members 376 and 378 to a pair of parallel bottom longitudinally extending link members 380 and 382, respectively, which are movably attached to the flat plate member 4 through transversely extending movable bar support members 384 and 385. Movable support members 384 and 385 are attached to the base member 4 by pivot bolt members 387 and 388, respectively. The transversely extending movable support members 384 and 385 support the bottom movable link members 380 and 382 through pivot bolt members 389 and 390 at the rear support member 385 and, pivot bolt members 391 and 392 at the front support member 384.

Attached above the front end of the link members 380 and 382 is a pair of adjustably mounted support members 122 and 396 which support lower blade guide assembly 102 which is attached thereto.

The support members 122 and 396 are attached to the link members 380 and 382 by a pair of adjusting bolts 393 and 313 on link member 380 and adjusting bolts 394 and 315 on link member 382. Each of the link members 380 and 382 are provided with a pair of elongated openings or slots therein to receive the bolts therethrough for longitudinal setting of the support members 395 and 396 in relation to the link members 380 and 382. Openings 316 and 317 are disposed to receive bolts 393 and 313 therein, respectively, and openings 318 and 319 are disposed to receive bolts 394 and 315 therein, respectively.

The lower blade guide assembly 102 includes a U-shaped bracket 381 with a vertically extending guide plate member 398 mounted onto one leg of the bracket 381. U-shaped bracket 381 is mounted underneath the support members 122 and 396 by pivotal bolt members 399 (FIG. 1) and 124 (FIG. 1), respectively. The vertically extending guide plate member 398 is provided with a vertically extending slot 306 therein to receive band saw blade 101 therethrough. However, again only the back edge of the band saw blade 101 is received by the slot 306 so the saw blade 101 is rotatably moved in response to the cooperating movement of the link members 380 and 382.

Figure 2:
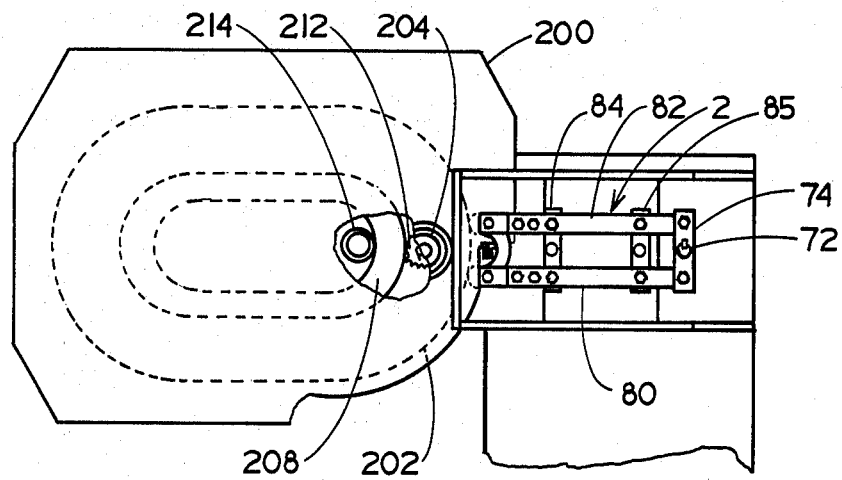
FIG. 2 is a plan view, with selected portions cut-away, of a feeding and sawing device including the guide attachment for a band saw blade of FIG. 1.
Figure 3:
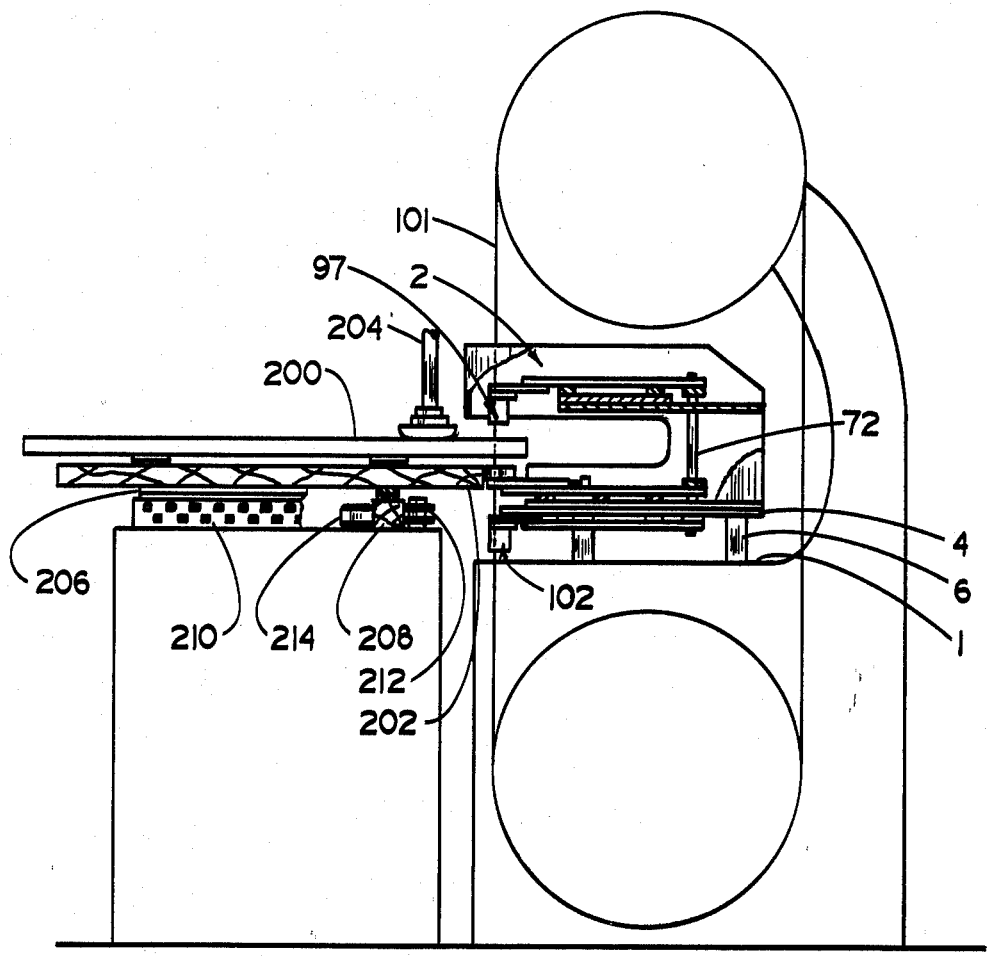
FIG. 3 is an elevational view, with selected portions cut-away, of the device of FIG. 2; and, FIG. 4 is a perspective view, with selected portions cut-away, of a lower blade guide assembly of the guide attachment of FIG. 1.

In FIGS. 2 and 3, a workpiece 200 and template 202 are illustrated to show the feeding means for the guide attachment 2 of the present invention. As shown, the template 202 is in communication with the guide rollers 30 and 32 and the workpiece 200 is held in place by a vertically extending weight or pressure device 204. The template 202 is supported by a pallet 206 and to the bottom of the pallet is affixed a track 208 by suitable means such as wood screws (not shown) and the like. Track 208 is illustrated as being of wood with an exterior surface of sheet metal 210. The track 208 is driven by engagement of the surface 210 with a double pinion 212 which is driven by appropriate motor means (not shown). A pressure member 214 is provided to press the track against the double pinion 212 for engagement with and driving the track 208. Means for exerting pressure on the member 214 may be any means known in the art, and are therefore not illustrated.

In operation, a workpiece 200 is placed upon template 202. Template 202 is engageable with guide rollers 30 and 32 wherein the link members are in movable cooperation with the guide rollers to position the saw blade 101 in alignment with and at a preselected distance from the guide rollers. Upon movement of the template 202 and workpiece 200, cooperating movement of the link members between the guide rollers 30 and 32 and the saw blade 101 aligns the saw blade 101 for a cutting position conforming to the contour of the outer periphery of the template 202.

It is realized that various changes may be made to the specific embodiment shown and described without departing from the scope and spirit of the present invention.

We claim:

1. A guide attachment for band saw machines comprising:
   a pair of parallel spaced lower support members secured to a head frame of a band saw machine, one of the lower support members extending along the front of the head frame, the other extending along the back, the lower support members being pivotally attached in substantially the center of each support member, the pivot points being in alignment with each other;
   a pair of parallel spaced lower side arm link members pivotally attached at opposed ends to the lower support members;
   the lower link members extending outwardly beyond the lower front support member, each lower link member having a guide roller attached at the outwardly extending portion for rotation about vertically extending parallel axes and engageable with a template; and,
   cooperating means for positioning a band saw blade in parallel alignment with the contour of the outer periphery of the template.

2. The guide attachment of claim 1, said cooperating means including an upwardly extending vertical support member fixedly attached to and extending upwardly from the lower support member extending along the back of the head frame, the vertical support member being fixedly attached to an upper cooperating band saw guide assembly.

3. The guide attachment of claim 2, said upper cooperating band saw guide assembly including a pair of parallel spaced transversely extending movable upper support members, one of the upper support members extending along and spaced above the front of the head frame, the other extending along the back, the upper back support member being fixedly attached to the upper extremity of the vertical support member; a pair of parallel spaced longitudinally extending upper side arm link members pivotally attached at opposed ends to the upper support members; and, band saw guide means attached to the outer extremity of at least one of the upper link members whereby a band saw blade turns in conformity with the outer periphery of a template.

4. The guide attachment of claim 3, the upper link members and the lower link members being of the same length and in spaced parallel alignment.

5. The guide attachment of claim 4, the vertical support being affixed to approximately the center of each of said upper and lower back supports, said back supports being of substantially the same length with said link members being substantially the same distance from the center of said supports.

6. The guide attachment of claim 1, said cooperating means including a vertically extending support member fixedly attached to and extending downwardly from said lower support member extending along the back of the head frame, the vertical support member being fixedly attached to a lower cooperating band saw guide assembly.

7. The guide attachment of claim 6, said lower cooperating band saw guide assembly including a pair of parallel spaced transversely extending movable bottom support members, one of the bottom support members extending along and spaced below the front of the head frame, the other extending along the back, the bottom back support member being fixedly attached to the bottom extremity of the vertical support member; a pair of parallel spaced longitudinally extending bottom side arm link members pivotally attached at opposed ends to the bottom support members; and, band saw guide means attached to the outer extremity of at least one of the bottom link members whereby a band saw blade turns in conformity with the outer periphery of a template.

8. The guide attachment of claim 7, the bottom link members and the lower link members being of the same length and in spaced parallel alignment.

9. The guide attachment of claim 8, the vertical support being affixed to approximately the center of each of the lower and bottom back supports, said back supports being of substantially the same lengths with said link members being substantially the same distance from the center of said supports.

* * * * *